US005594835A

United States Patent [19]
Rahman et al.

[11] Patent Number: 5,594,835
[45] Date of Patent: Jan. 14, 1997

[54] NEURAL-FUZZY LOGIC CONTROL SYSTEM WITH ADJUSTABLE FUZZY LOGIC MEMBERSHIP FUNCTIONS

[75] Inventors: Sayeedur C. Rahman, San Francisco; Emdadur R. Khan, San Jose, both of Calif.

[73] Assignee: National Semiconductor Corporation, Santa Clara, Calif.

[21] Appl. No.: 284,130

[22] Filed: Aug. 2, 1994

Related U.S. Application Data

[63] Continuation-in-part of Ser. No. 36,634, Mar. 24, 1993.

[51] Int. Cl.$^6$ ............................................. G06F 17/00
[52] U.S. Cl. ................... 395/51; 395/50; 395/63; 395/900; 395/3
[58] Field of Search ............... 395/50–77, 20–27, 395/3, 10, 900; 382/155–159; 364/420

[56] References Cited

U.S. PATENT DOCUMENTS 5,168,549  12/1992  Takagi et al. ............................. 395/3

FOREIGN PATENT DOCUMENTS

| 2-260002 | 10/1990 | Japan | G05B 13/02 |
| 2-292602 | 12/1990 | Japan | G05B 13/02 |
| 3-268077 | 11/1991 | Japan | G06G 7/60 |
| 3-291729 | 12/1991 | Japan | G06F 9/44 |
| 4-92901 | 3/1992 | Japan | G05B 13/02 |
| 4-77828 | 3/1992 | Japan | G06F 9/44 |
| 4-170641 | 6/1992 | Japan | G06F 9/44 |
| 4-186402 | 7/1992 | Japan | G05B 13/02 |
| 4-205163 | 7/1992 | Japan | G06F 15/18 |

OTHER PUBLICATIONS

Keller, et al., "Fuzzy Logic Inference Neural Networks", SPIE, vol. 1192, pp. 582–591, Intelligent Robots and Computer Vision VIII: Algorithms and Techniques, 1989.

Cox, Earl, "Integrating Fuzzy Logic into Neural Nets", AI Expert, Jun. 1992, pp. 43–47.

Cela, et al., "Towards A Neural Fuzzy Controller", IEEE, Systems, Man, and Cybernetics, 1992 International, pp. 1277–1282.

Horikawa, et al., "On Fuzzy Modeling Using Fuzzy Neural Networks with the Back–Propagation Algorithm", IEEE, Transactions on Neural Networks, vol. 3, No. 5 Sep. 1992, pp. 801–806.

Sun, et al., "Fuzzy Modeling Based On Generalized Neural Networks And Fuzzy Clustering Objective Functions", IEEE, Proceedings of the 30th Conference on Decision and Control, Dec. 1991, Brighton, England, pp. 2924–2929.

Kawamura, et al., "A Prototype of Neuro–Fuzzy Cooperation System", IEEE International Conference On Fuzzy Systems, Mar. 8–12, 1992, San Diego, CA pp. 1275–1285.

Buckley, et al., "On the Equivalence of Neural Networks and Fuzzy Expert Systems", IEEE, 1992, pp. II–691–II–695.

Rumelhart, et al., "Learning Internal Representations by Error Propagation", Chapter 41, pp. 675–682, 1986.

Nie, et al., "Fuzzy Reasoning Implemented by Neural Networks", IEEE, pp. II–702 –II–707, 1992.

Berenji, Hamid R., "Refinement of Approximate Reasoning–based Controllers by Reinforcement Learning", Machine Learning: Proceedings of the Eighth International Workshop, Evanston, Illinois, Jun. 27–29, 1991(5 pages).

"National Semiconductor Looks to Marry Neural Networks and Fuzzy Control", Electronic Products, Aug. 1992, p. 21.

Primary Examiner—Tariq R. Hafiz
Attorney, Agent, or Firm—Limbach & Limbach L.L.P.

[57] ABSTRACT

A fuzzy logic system and method for controlling a plant in accordance with fuzzy logic processing using data representing fuzzy logic rules and membership functions includes elements and steps, respectively, for performing fuzzy processing (i.e. antecedent processing, rule evaluation and neural defuzzification) of a plant control signal to control a plant (e.g. servomechanism) and adjusting the membership functions based upon differences between desired and actual performance criteria for the plant being controlled.

29 Claims, 4 Drawing Sheets

NEURAL-FUZZY LOGIC CONTROL SYSTEM WITH ADJUSTABLE FUZZY LOGIC MEMBERSHIP FUNCTIONS

RELATED APPLICATIONS

This is a Continuation-In-Part of application Ser. No. 08/036,634, filed Mar. 24, 1993, and entitled "Fuzzy Logic Design Generator Using A Neural Network To Generate Fuzzy Logic Rules And Membership Functions For Use In Intelligent Systems" (the disclosure of which is incorporated herein by reference).

BACKGROUND OF THE INVENTION

1. Field of the Invention

The present inventions relates to intelligent control systems, and in particular, to intelligent controllers using neural network-based fuzzy logic.

2. Description of the Related Art

Fuzzy logic offers a number of significant advantages over conventional design approaches for non-linear systems. For example, non-linear and time-variant systems which are poorly understood or are difficult to model or implement in a cost effective manner can be designed using fuzzy logic. Further, fuzzy logic offers cost effective, as well as robust, solutions. However, in conventional fuzzy logic design, the shaping of the membership functions and the generating of an optimal number of appropriate rules often proves to be quite difficult. Further, as the complexity of the design increases, such difficulty in producing a conventional fuzzy logic solution increases dramatically. Accordingly, conventional fuzzy logic design has embraced the use of neural networks, resulting in the development of "neural-fuzzy" technology.

In neural-fuzzy technology, a neural network is used to generate the fuzzy logic rules and membership functions of the system. Sample input/output patterns are used as the input to the neural network. The network learns based upon these patterns and generates appropriate rules and membership functions. Since the neural network is highly computation intensive, the equivalent fuzzy logic model (obtained from a direct mapping of the neural network into a fuzzy logic model) provides a more cost effective solution, as compared to the neural network solution by itself.

However, a major drawback of the neural-fuzzy design approach is that the accuracy of the solution is limited by the accuracy of the training data. Accurate training data is quite difficult to obtain and inaccuracies in the training data are reflected in the fuzzy logic solution produced by the neural network. In a worst case situation, the neural network may never converge to a desired level of accuracy because of discontinuities in corrupted training data. In such cases, some measures may need to be taken to improve the discontinuities in the training data. However, some discrepancies may still remain and so the accuracy of the actual fuzzy system may not be adequate, although the fuzzy logic accuracy would map well to neural network accuracy.

SUMMARY OF THE INVENTION

A neural-fuzzy logic control system in accordance with one embodiment of the present invention controls a plant using data representing fuzzy logic rules and membership functions, and includes a rule source, a membership function source, a controller and a decision maker. The rule source provides a rule signal representing fuzzy logic rules. The membership function source receives a membership function control signal and in accordance therewith provides a membership signal representing fuzzy logic membership functions. The controller is adapted for coupling to a plant and is coupled to the rule source and membership function source to receive the rule signal and the membership signal. The controller also receives an input control signal which corresponds to a desired plant performance criterion for the plant. In response thereto and in accordance with fuzzy logic processing (i.e. antecedent processing, rule evaluation and neural defuzzification), the controller provides, for use by the plant, an output control signal representing the desired plant performance criterion. The decision maker is coupled to the controller and the membership function source to receive and compare the output control signal and a performance signal which corresponds to an actual plant performance criterion for the plant, and in accordance therewith provide the membership function control signal to the membership function source.

A control method in accordance with another embodiment of the present invention controls a plant in accordance with signals representing fuzzy logic rules and membership functions. A rule signal which represents a set of fuzzy logic rules is provided. A membership function control signal is received and in accordance therewith a membership signal which represents a set of fuzzy logic membership functions is provided. An input control signal is received which corresponds to a desired plant performance criterion for a plant and in response thereto in accordance with the rule signal, the membership function control signal and fuzzy logic processing (i.e. antecedent processing, rule evaluation and neural defuzzification) an output control signal which represents the desired plant performance criterion is provided for use by the plant. A performance signal which corresponds to an actual plant performance criterion for the plant is received and compared with the output control signal and in accordance therewith the membership function control signal is provided.

Hence, in accordance with the present invention, an approximate fuzzy logic solution obtained by training a neural network with an inaccurate training data set can be fine tuned by adjusting the membership functions without changing the fuzzy logic rules. This allows an optimized set of rules to be generated and retained, thereby eliminating any need to generate new fuzzy logic rules and membership functions from scratch. Further, fine tuning the membership functions is simplified by the use of fuzzy logic processing (i.e. antecedent processing, rule evaluation and neural defuzzification).

These and other features and advantages of the present invention will be understood upon consideration of the following detailed description of the invention and the accompanying drawings.

DETAILED DESCRIPTION OF THE INVENTION

Figure 1:
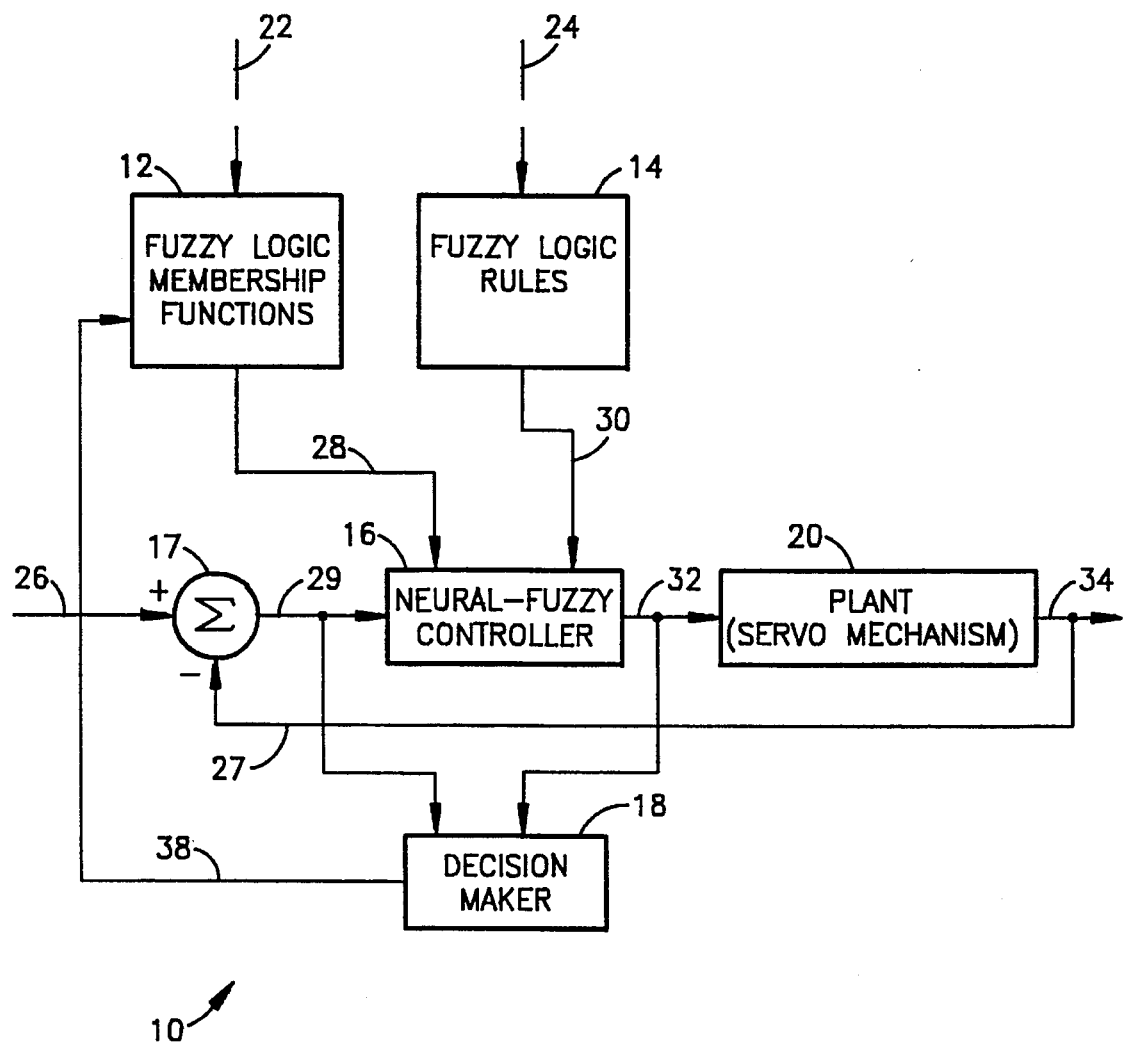
FIG. 1 is a functional block diagram of a neural-fuzzy system in accordance with a preferred embodiment of the present inventions.

Referring to FIG. 1, a neural-fuzzy logic control system 10 in accordance with a preferred embodiment of the present invention includes a fuzzy logic membership function source 12, fuzzy logic rule source 14, neural-fuzzy controller 16, signal combiner 17 and decision maker 18, connected substantially as shown, to control a plant 20 (e.g. servomechanism). The fuzzy logic membership function source 12 and fuzzy logic rule source 14 are preferably storage apparatuses, such as memory devices (e.g. RAM, ROM, EEPROM, etc.), in which data 22 representing fuzzy logic membership functions and data 24 representing fuzzy logic rules have been stored, respectively. Such fuzzy logic membership function data 22 and fuzzy logic rule data 24 can be generated with and extracted from a neural-fuzzy logic system (not shown) such as that described in the above-identified application Ser. No. 08/036,634 (the disclosure of which is incorporated herein by reference).

The system 10 receives an input signal 26 which represents a desired performance criterion for the plant 20. This input signal 26 is differentially summed with a feedback signal 27 from the plant 20 to provide a performance signal 29 for the neural-fuzzy controller 16. The feedback signal 27 from the plant 20 represents an actual plant performance criterion for the plant 20. Accordingly, since the input signal 26 represents a desired performance criterion for the plant 20, the differential combination of these signals 26, 27, i.e. the performance signal 29, corresponds to both the actual and desired plant performance criteria for the plant 20 in that it represents the difference between them.

Using fuzzy logic membership function data 28 and fuzzy logic rule data 30 from the fuzzy logic membership function source 12 and fuzzy logic rule source 14, respectively, the neural-fuzzy controller 16 performs fuzzy logic processing (including antecedent processing, rule evaluation and neural defuzzification) of the performance signal 29 to produce an output control signal 32. (The fuzzy logic processing performed by the neural-fuzzy controller 16 is discussed in more detail below and in the above-identified application Ser. No. 08/036,634.) This output control signal 32, also intended to represent the desired plant 20 performance criterion, is used to drive, or control, the plant 20. The plant 20 provides a performance signal 34 (at least a portion of which is fed back to the signal combiner 17) which corresponds to an actual performance criterion of the plant 20. (Various plant performance criteria which can be represented by these signals 26, 29, 32, 34, can include, e.g. in the case of a servomechanism, performance parameters such as rotor speed, rotor position, stator current, etc.)

The decision maker 18 compares the output control signal 32 with the performance signal 29. The result of this comparison is a membership function control signal 38 outputted by the decision maker 18 to the fuzzy logic membership function source 12. As discussed further below, this control signal 38 causes the fuzzy logic membership function source 12 to modify the membership data signal 28 provided to the neural-fuzzy controller 16.

Figure 2A:
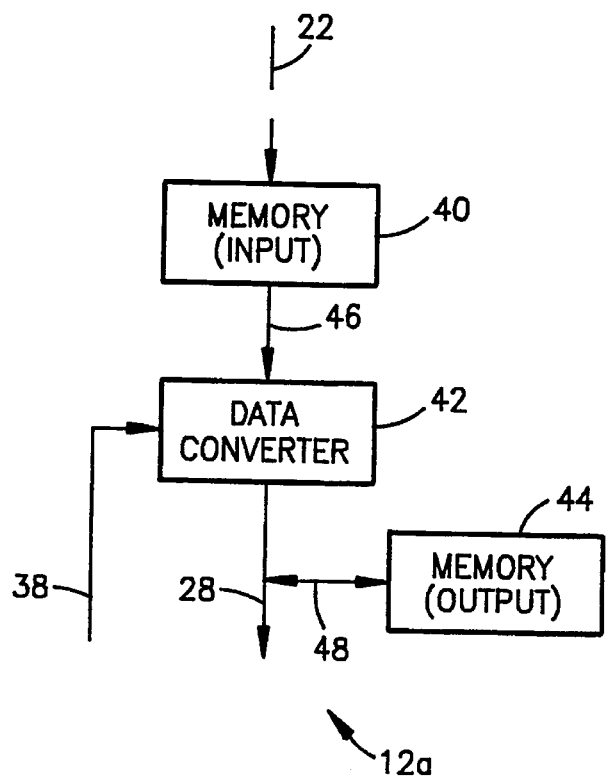
FIGS. 2A and 2B are functional block diagrams of exemplary embodiments of the fuzzy logic membership function source of FIG. 1.

Referring to FIG. 2A, one embodiment 12a of the fuzzy logic membership function source 12 includes an input memory 40, a data converter 42 and an output memory 44, interconnected substantially as shown. The input memory 40 receives and stores the initial fuzzy logic membership function data 22 (discussed above). When outputted therefrom, this data 46 is converted by the data converter 42 in accordance with the membership function control signal 38. (It should be understood that the data converter 42 can be used to convert the fuzzy logic membership function data 46 as desired, e.g. in accordance with virtually any linear or non-linear function). The converted data 48 is stored in the output memory 44 for subsequent retrieval therefrom as the fuzzy logic membership function data 28 for use by the neural-fuzzy controller 16, as discussed above. From the foregoing, it should be understood that the output memory 44 can be eliminated by making the membership function control signal 38 available as often, or as long, as needed to cause the data converter 42 to consistently convert the fuzzy logic membership function data 46 from the input memory 40.

Figure 2B:
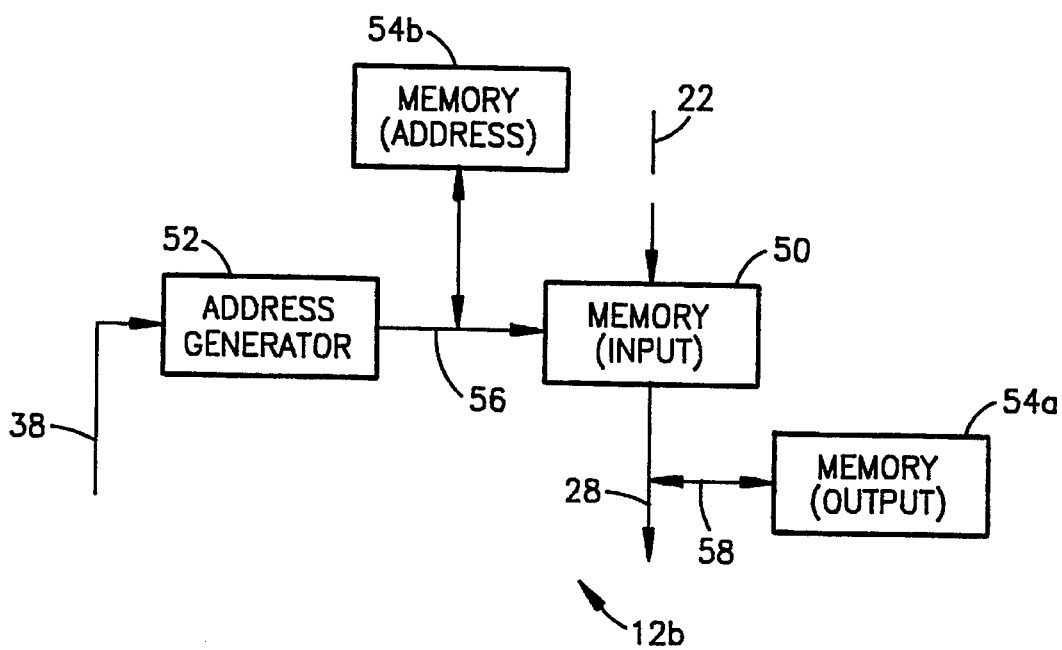

Referring to FIG. 2B, an alternative embodiment 12b of the fuzzy logic membership function source 12 includes an input memory 50, an address generator 52 and an output memory 54a (or, alternatively, an address memory 54b), interconnected substantially as shown. The input memory 50 receives and stores the initial fuzzy logic membership function data 22 (discussed above). In accordance with the membership function control signal 38, the address generator 52 generates memory addresses 56 for accessing and retrieving the data stored in the input memory 50. The outputted data 58 is then stored in the output memory 54a. As should be understood, the membership function control signal 38 causes the address generator 52 to output addresses 56 which access the contents of the input memory 50 in such a manner as to cause the outputted data 58 to represent "modified" fuzzy logic membership functions, i.e. ones which differ from those represented by the original fuzzy logic membership function data 22. This data 58 is subsequently retrieved from the output memory 54a as the fuzzy logic membership function data 28 for use by the neural-fuzzy controller 16, as discussed above. Alternatively, an address memory 54b can be used to store the addresses 56 generated by the address generator 52. These addresses 56 can then be later retrieved from the address memory 54b to selectively access and retrieve the initial fuzzy logic membership function data 28 from the input memory 50 in such a manner as to cause it to now represent new fuzzy logic membership functions. From the foregoing, it should be understood that using the output memory 54a or the address memory 54B this way avoids the need for a continuous, or repeated, membership function control signal 38 to drive the address generator 52.

Figure 3:
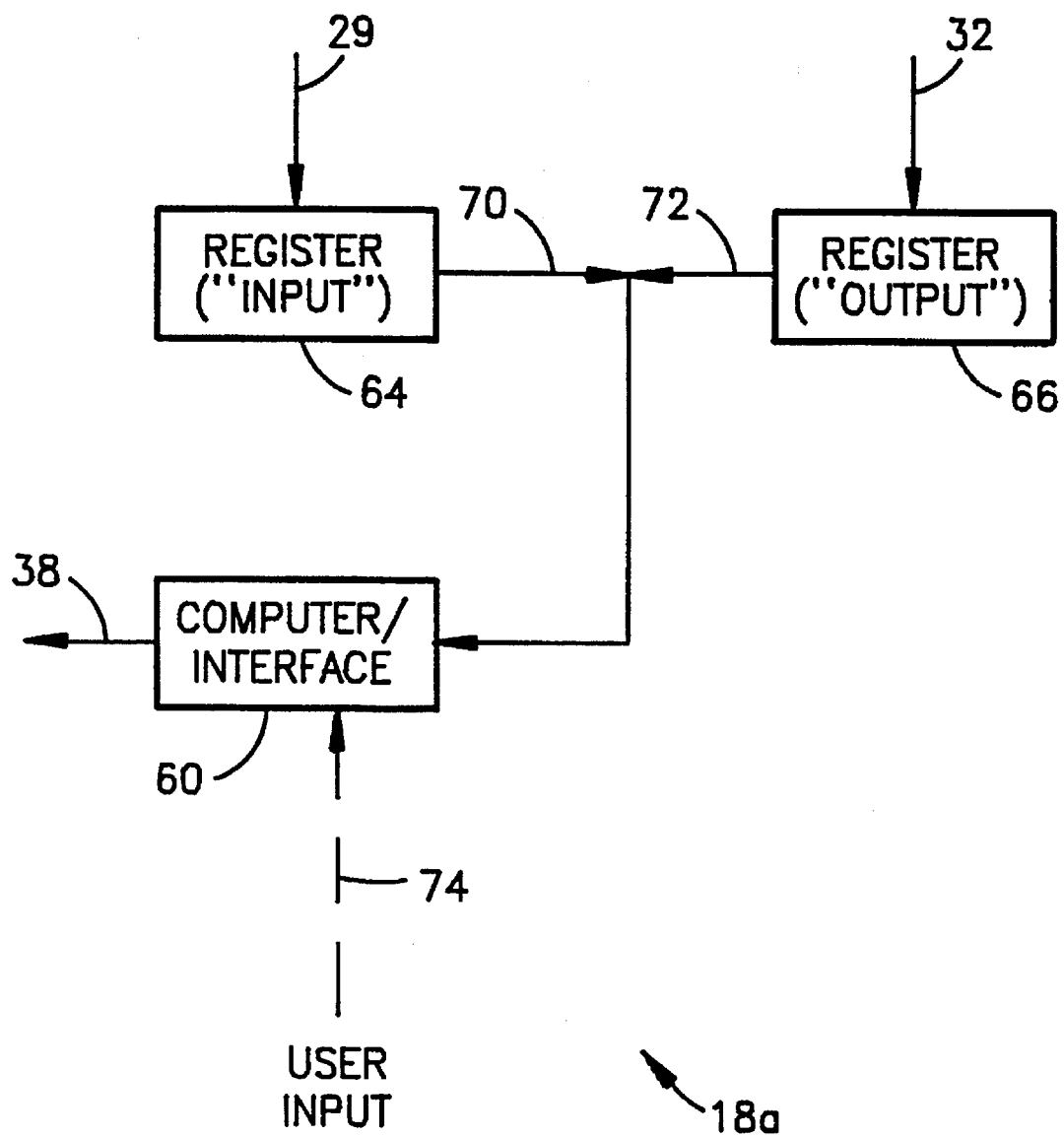
FIG. 3 is a functional block diagram of an exemplary embodiment of the decision maker of FIG. 1.

Referring to FIG. 3, one embodiment 18a of the decision maker 18 of FIG. 1 includes a computer (or designer interface, e.g. for interactive control) 60, an input register 64 and an output register 66, interconnected substantially as shown. The input register 64 receives and stores performance data received via the performance signal 29, while the output register 66 receives and stores control data received via the output control signal 32. These data 70, 72 are retrieved and compared within the computer/interface 60. As discussed above, based upon these data comparisons, the computer/interface 60 provides the membership Function control signal 38. (From the foregoing, it should be understood that the computer can be programmed to perform the above-discussed comparison, or alternatively, the user of the system 10, e.g. a designer, can interactively evaluate the performance 70 and control 72 data via the interface 60 to determine and provide, e.g. via a user input signal 74, a desireable membership function control signal 38.)

Figure 4:
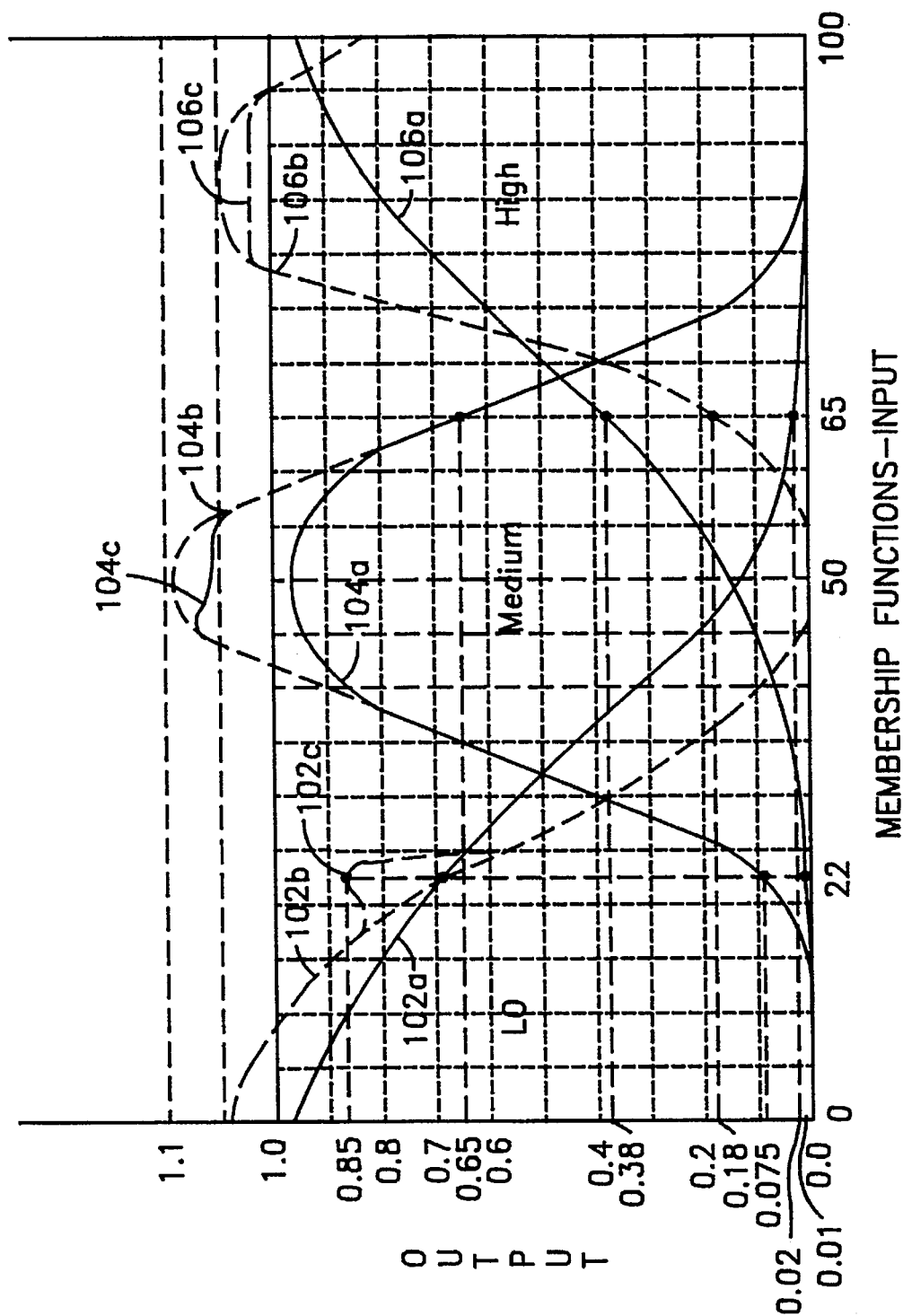
FIG. 4 is an exemplary graph of fuzzy logic membership functions adjusted in accordance with a preferred embodiment of the present invention.

Referring to FIG. 4, an exemplary membership functions graph in a two-dimensional (Cartesian) coordinate system are illustrated in both their original and modified forms. As can be seen, the original membership functions 102a, 104a and 106a have peak values (i.e. maximum normalized ordinate values) which correspond to input (i.e. abscissa) values of 0, 50 and 100. In accordance with a preferred embodiment of the present invention, these membership functions 102a, 104a and 106a can be selectively modified to appear as shown by graphs 102b, 104b and 106b, respectively. As can be seen, these modified membership functions 102b, 104b, 106b differ from the original membership functions 102a, 104a, 106a in both their heights and shapes. The modified shapes of these exemplary membership functions 102b, 104b, 106b result in modified function slopes in the case of functions 102b and 106b, a lateral shift in the peak value of function 106b (to an abscissa value of approximately 85) and increases in the peak values for all three functions 102b, 104b, 106b.

From the foregoing, it can be seen that a neural-fuzzy system in accordance with a preferred embodiment of the present invention has a number of advantages. For example, an approximate fuzzy logic solution obtained by training a neural network with an inaccurate training data set can be fine tuned by adjusting the membership functions without changing the generated fuzzy logic rules. This allows the optimized number of rules (see above-identified application Ser. No. 08/036,634) to be retained while at the same time eliminating the tedious and often very difficult process of generating new fuzzy logic rules and membership functions from scratch. Further, fine tuning the membership functions is quite simple when a neural defuzzification process is used, in accordance with the discussion in the above-identified application Ser. No. 08/036,634. As discussed therein, the neural-fuzzy defuzzification process can be characterized as follows:

$$\text{System Output} = \sum_{1}^{j} (U_{1j}U_{2j}U_{3j} \ldots U_{nj})Y_j$$

where:

U=degree of membership ("DOM")

m=total number of inputs (antecedents)

Y=consequent j=rule number

As indicated above, the degrees of membership of the antecedents are multiplied and the result is then multiplied by the consequent of the rule. This is done for each rule and the results are then summed together to produce the system output. Hence, the impact of increasing or decreasing a certain degree of membership can be easily seen. For example, the degree of membership for any given membership function and for a specific input value can be easily increased or decreased by an increasing or decreasing the height of that membership function. This will result in a corresponding increase or decrease in the magnitude of the contribution of the related rules. For example, when fine tuning a particular area of operation where the system response is unacceptable, the shapes of the membership functions in "localized" regions can be modified to increase or decrease the degree of membership for any input value within such regions. Hence, for the exemplary modified membership functions 102b, 104b, 106b of FIG. 4, further "local" adjustments 102c, 104c and 106c can be made to fine tune the overall system to cause it to perform more accurately as desired. With an approximate solution already provided by the originally generated membership functions, the neural defuzzification process makes such fine tuning of the membership functions quite simple.

Referring again to FIG. 4, some examples will be given to illustrate the ease with which the effects of fuzzy logic membership functions modified in accordance with the foregoing discussion can be determined. For the sake of this illustration, let it be assumed that the fuzzy logic rules are as follows:

If Input=LO, Then Output=0.9

If Input=MED, Then Output=0.3

If Input=HI, Then Output=−0.4

Based upon these rules and the membership functions 102, 104, 106 of FIG. 4, if the input is equal to 22 then the output can be expressed as follows:

$$\begin{aligned} \text{Output} &= (LO)(0.7) + (MED)(0.075) + (HI)(0.01) \\ &= (0.9)(0.7) + (0.3)(0.075) + (-0.4)(0.01) \\ &= 0.6485 \end{aligned}$$

However, if the first modified fuzzy logic membership function 102b is further modified as shown at 102c, then the output becomes:

$$\begin{aligned} \text{Output} &= (0.9)(0.85) + (0.3)(0.075) + (-0.4)(0.01) \\ &= 0.7835 \end{aligned}$$

But if, instead, the input is equal to 65, then the output, using the original, i.e. unmodified, fuzzy logic membership functions 102a, 104a, 106a, becomes:

$$\begin{aligned} \text{Output} &= (0.9)(0.02) + (0.3)(0.65) + (-0.4)(0.38) \\ &= 0.0610 \end{aligned}$$

However, if the modified fuzzy logic membership functions 102b, 104b, 106b are used, then the output becomes:

$$\begin{aligned} \text{Output} &= (0.9)(0) + (0.3)(0.65) + (-0.4)(0.18) \\ &= 0.1230 \end{aligned}$$

From the foregoing, it can be further seen that a neural-fuzzy system having modified membership functions in accordance with a preferred embodiment of the present invention can be used to collect new input/output data to further improve the fuzzy logic solution. The new data set can be used to retrain the neural-fuzzy system for better accuracy. The newly generated membership functions can then be further fine tuned, as discussed above, to further improve the fuzzy logic solution. This iterative process can be repeated as desired to achieve a desired accuracy.

Various other modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A neural-fuzzy control system for controlling a plant in accordance with signals representing fuzzy logic rules and membership functions, said neural-fuzzy control system comprising:

a rule source for providing a rule signal which represents a plurality of fuzzy logic rules;

a membership function source for receiving a membership function control signal and in accordance therewith outputting a membership signal which represents a plurality of fuzzy logic membership functions;

a controller, coupled to said rule source and said membership function source, for coupling to a plant and for receiving said rule signal, said membership signal and an input control signal which corresponds to a desired plant performance criterion for said plant and outputting in response thereto in accordance with fuzzy logic processing an output control signal representing said desired plant performance criterion for use by said plant; and a decision maker, coupled to said controller and said membership function source, for receiving and comparing said output control signal and a performance signal which corresponds to an actual plant performance criterion for said plant and in accordance therewith outputting said membership function control signal to said membership function source, wherein said membership signal outputted by said membership function source is modified in accordance with said membership function control signal.

2. A neural-fuzzy control system as recited in claim 1, wherein said rule source comprises a memory for storing and outputting data as said rule signal.

3. A neural-fuzzy control system as recited in claim 1, wherein said membership function source comprises a converter for receiving a data signal which represents an initial plurality of fuzzy logic membership functions and for receiving said membership function control signal and in accordance therewith convening said data signal to said membership signal.

4. A neural-fuzzy control system as recited in claim 1, wherein said membership function source comprises a memory for storing and outputting data as said membership signal.

5. A neural-fuzzy control system as recited in claim 4, wherein said membership function source further comprises a data converter, coupled to said memory, for receiving said membership function control signal and in accordance therewith converting said outputted memory data to generate said membership signal.

6. A neural-fuzzy control system as recited in claim 1, wherein said membership function source comprises a memory for receiving a memory addressing signal as said membership function control signal and in accordance therewith outputting selected data stored therein as said membership signal.

7. A neural-fuzzy control system as recited in claim 1, wherein said controller comprises a neural network-based, fuzzy logic controller.

8. A neural-fuzzy control system as recited in claim 7, wherein said controller further comprises a signal combiner for coupling to said plant to receive therefrom a plant signal which represents said actual plant performance criterion for said plant and for combining said plant signal and said input control signal to generate said performance signal.

9. A neural-fuzzy control system as recited in claim 1, wherein said decision maker comprises a computer for receiving first data via said output control signal and second data via said performance signal, comparing said first and second data and in accordance therewith outputting said membership function control signal to said membership function source.

10. A neural-fuzzy control system as recited in claim 1, wherein said decision maker comprises a user interface for outputting first data corresponding to said output control signal and second data corresponding to said performance signal and for receiving a user control signal which corresponds to a comparison of said first and second data.

11. A method of providing a neural-fuzzy control system for controlling a plant in accordance with signals representing fuzzy logic rules and membership functions, said method comprising the steps of:

providing a rule source for outputting a rule signal which represents a plurality of fuzzy logic rules;

providing a membership function source for receiving a membership function control signal and in accordance therewith outputting a membership signal which represents a plurality of fuzzy logic membership functions;

providing a controller for coupling to said rule source, said membership function source and a plant and for receiving said rule signal, said membership signal and an input control signal which corresponds to a desired plant performance criterion for said plant and outputting in response thereto in accordance with fuzzy logic processing an output control signal representing said desired plant performance criterion for use by said plant; and providing a decision maker for coupling to said controller and said membership function source and for receiving and comparing said output control signal and a performance signal which corresponds to an actual plant performance criterion for said plant and in accordance therewith outputting said membership function control signal to said membership function source, wherein said membership signal outputted by said membership function source is modified in accordance with said membership function control signal.

12. A method as recited in claim 11, wherein said step of providing a rule source comprises providing a memory for storing and outputting data as said rule signal.

13. A method as recited in claim 11, wherein said step of providing a membership function source comprises providing a converter for receiving a data signal which represents an initial plurality of fuzzy logic membership functions and for receiving said membership function control signal and in accordance therewith converting said data signal to said membership signal.

14. A method as recited in claim 11, wherein said step of providing a membership function source comprises providing a memory for storing and outputting data as said membership signal.

15. A method as recited in claim 14, wherein said step of providing a membership function source further comprises providing a data converter for coupling to said memory and for receiving said membership function control signal and in accordance therewith convening said outputted memory data to generate said membership signal.

16. A method as recited in claim 11, wherein said step of providing a membership function source comprises providing a memory for receiving a memory addressing signal as said membership function control signal and in accordance therewith outputting selected data stored therein as said membership signal.

17. A method as recited in claim 11, wherein said step of providing a controller comprises providing a neural network-based, fuzzy logic controller.

18. A method as recited in claim 17, wherein said step of providing a controller further comprises providing a signal combiner for coupling to said plant to receive therefrom a plant signal which represents said actual plant performance criterion for said plant and for combining said plant signal and said input control signal to generate said performance signal.

19. A method as recited in claim 11, wherein said step of providing a decision maker comprises providing a computer for receiving first data via said output control signal and second data via said performance signal, comparing said first and second data and in accordance therewith outputting said membership function control signal to said membership function source.

20. A method as recited in claim 11, wherein said step of providing a decision maker comprises providing a user interlace for outputting first data corresponding to said output control signal and second data corresponding to said performance signal and for receiving a user control signal which corresponds to a comparison of said first and second data.

21. A control method for controlling a plant in accordance with signals representing fuzzy logic rules and membership functions, said control method comprising the steps of:

providing a rule signal which represents a plurality of fuzzy logic rules;

receiving a membership function control signal and in accordance therewith outputting a membership signal which represents a plurality of fuzzy logic membership functions;

receiving an input control signal which corresponds to a desired plant performance criterion for a plant and outputting in response thereto in accordance with said rule signal, said membership function control signal and fuzzy logic processing an output control signal representing said desired plant performance criterion for use by said plant;

receiving a performance signal which corresponds to an actual plant performance criterion for said plant;

comparing said output control signal and said performance signal and in accordance therewith outputting said membership function control signal; and modifying said membership signal in accordance with said membership function control signal.

22. A control method as recited in claim 21, wherein said step of providing said rule signal comprises outputting data from a memory.

23. A control method as recited in claim 21, wherein said step of receiving said membership function control signal and in accordance therewith outputting said membership signal comprises:

receiving a data signal which represents an initial plurality of fuzzy logic membership functions; and receiving said membership function control signal and in accordance therewith convening said data signal to said membership signal.

24. A control method as recited in claim 21, wherein said step or receiving said membership function control signal and in accordance therewith outputting said membership signal comprises outputting data from a memory.

25. A control method as recited in claim 24, wherein said step of receiving said membership function control signal and in accordance therewith outputting said membership signal further comprises receiving said membership function control signal and in accordance therewith convening said outputted memory data to generate said membership signal.

26. A control method as recited in claim 21, wherein said step of receiving said membership function control signal and in accordance therewith outputting said membership signal comprises receiving a memory addressing signal and in accordance therewith outputting selected data from a memory.

27. A control method as recited in claim 21, wherein said step of receiving said input control signal and outputting said output control signal in response thereto in accordance with said rule signal, said membership function control signal and fuzzy logic processing comprises processing said input control signal, said rule signal and said membership function control signal with a neural network-based, fuzzy logic controller.

28. A control method as recited in claim 27, wherein said step of receiving said input control signal and outputting said output control signal in response thereto in accordance with said rule signal, said membership function control signal and fuzzy logic processing further comprises:

receiving from said plant a plant signal which represents said actual plant performance criterion for said plant; and combining said plant signal and said input control signal to generate said performance signal.

29. A control method as recited in claim 21, wherein said step of comparing said output control signal and said performance signal and in accordance therewith outputting said membership function control signal comprises receiving first data via said output control signal and second data via said performance signal, comparing said first and second data and in accordance therewith outputting said membership function control signal.

\* \* \* \* \*

UNITED STATES PATENT AND TRADEMARK OFFICE
CERTIFICATE OF CORRECTION

PATENT NO. : 5,594,835
DATED : January 14, 1997
INVENTOR(S) : SAYEEDUR CHOWDHURY RAHMAN ET AL.

It is certified that error appears in the above-identified patent and that said Letters Patent is hereby corrected as shown below:

In Col. 7, line 24, delete "convening" and replace with --converting--.

In Col. 8, line 43, delete "convening" and replace with --converting--.

In Col. 9, line 3, delete "interlace" and replace with --interface--.

In Col. 9, line 42, delete "convening" and replace with --converting--.

In Col. 10, line 2, delete "or" and replace with --of--.

In Col. 10, line 9, delete "convening" and replace with --converting--.

Signed and Sealed this

Twenty-fifth Day of March, 1997

Attest:

BRUCE LEHMAN

*Attesting Officer*     Commissioner of Patents and Trademarks